Patented Feb. 7, 1939

2,146,018

UNITED STATES PATENT OFFICE 2,146,018

OXIDATION OF HYDROCARBONS

Emil Keunecke, Oppau, and Robert Werner, Ludwigshafen-on-the-Rhine, Germany, assignors to I. G. Farbenindustrie Aktiengesellschaft, Frankfort-on-the-Main, Germany No Drawing. Application July 9, 1935, Serial No. 30,466. In Germany July 17, 1934

6 Claims. (Cl. 260—451)

The present invention relates to the oxidation of hydrocarbons.

In the oxidation of solid or liquid hydrocarbons of the aliphatic series having a higher molecular weight, especially those having more than 10 carbons in the molecule, such as paraffin, while in the liquid phase, with air or other gases containing or supplying oxygen, it is of importance to free the said initial substances from such constituents as check up oxidation. In order to remove those constituents the hydrocarbons have already been subjected, prior to oxidation, to an oxidizing or hydrating treatment, this pretreatment however failed in cases, for example, where petrolatum is to be oxidized. By oxidizing petrolatum purified in such a manner fatty acids are not at all formed or are formed only to a very slight extent. It has also already been proposed to effect the purification of the initial materials to be oxidized quite generally by means of chemical reagents which cause the removal of olefinic, aromatic, naphthenic as well as of paraffinic hydrocarbons having a tertiary carbon atom; chemical reagents of the said kind, however, have not been indicated in connection with the said proposal.

We have now found that the hydrocarbons to be oxidized may very simply be freed to a great extent from the constituents retarding the oxidation by treating them, while in a liquid condition, with anhydrous halides readily hydrolizable by water. As halides of the said kind we may mention for example boron fluoride, boron chloride, anhydrous aluminium chloride, silicon tetrachloride, titanium tetrachloride, tin tetrachloride, zinc chloride, ferric chloride, antimony pentachloride and the like. It is as a rule sufficient for the said treatment to employ the said halides in an amount of say between 1 and 3 per cent, calculated with reference to the hydrocarbons to be treated, in some cases however a smaller percentage also will do. The treatment is preferably effected in heatable vessels, with surfaces made of enamel, iron or aluminium fitted with a stirring device at temperatures of from 50° to about 110° C. The duration of treatment depends in particular on the materials applied and also on the working temperature. In general, when working at 100° C. and employing aluminium chloride, ferric chloride or tin tetrachloride a duration of action of between half an hour and 2 hours is sufficient. During the reaction a tough polymerization product which is withdrawn prior to oxidation is formed as a sediment. It is preferable to free the purified hydrocarbon also from any remainders of this polymerization product by filtration, for example by means of substances having large surfaces, as for example kieselguhr, coal, bleaching earths and the like. The initial materials thus treated, may in all cases be rapidly oxidized while in a liquid condition, by means of air or other gases containing or supplying oxygen, into fatty acids, alcohols etc. at temperatures of between 100° and about 180° C., the oxidation products being obtained in a good yield and with lower amounts of undesired by-products resulting from over-oxidation.

The pretreatment described presents advantages even in the oxidation of white paraffin in blocks which may of itself be readily oxidized in that by the subsequent oxidation purer fatty acids and better yields are obtained than with employing the same, but untreated paraffin.

It is known to treat paraffin wax, bleached by hydrogenation, in liquid state with anhydrous aluminium chloride in order to obtain a completely pure paraffin wax fast to light. From this known process applicants' process could not be derived since it could not be foreseen that by the purification of the high molecular hydrocarbons with anhydrous halides which are readily hydrolized with water, hydrocarbons can be obtained which yield by oxidation especially larger amounts of fatty acids of high purity. This result was surprising; moreover the present process can be employed also in cases where the purification of high molecular hydrocarbons by oxidation or hydrogenation fails, for example when employing petrolatum as initial material.

The following examples will further illustrate how the present invention is carried out in practice, but the invention is not restricted to these examples. The parts are by weight.

Example 1

10 parts of brown crude paraffin obtained from the hydrogenation product of brown coal are twice reacted for 1 hour each time with 0.19 part of anhydrous aluminium chloride at 105° C. while vigorously stirring. The resulting resin of a tough consistency is withdrawn, after the treatment is complete, from the purefied paraffin. The latter is then filtered while adding 0.5 per cent of bleaching earth, in order to remove any residues of resin.

Into the paraffin thus treated, after addition of 0.3 per cent of manganese stearate and 0.2 per cent of soda, air is blown in a most finely distributed form for 20 minutes at 115° C. The resulting oxidation product has a very pale coloration. By working it up, pale fatty acids are obtained which contain less than 0.5 per cent of hydroxy acids insoluble in petroleum ether and can be distilled with a good yield.

A similar result is obtained by employing instead of the aluminium chloride corresponding amounts of boron fluoride, titanium tetrachloride and silicon tetrachloride or antimony pentachloride.

*Example 2*

10 parts of a petrolatum resulting in the manufacture of lubricating oils, having a yellow brown color, are twice reacted for half an hour each time with 0.16 part of ground anhydrous aluminium chloride at 95° C. while stirring. After removal of the resin formed the remaining hydrocarbon is filtered through bleaching earth. It is then oxidized for 3 hours at 160° C. with air in a cylindrical vessel after addition of 0.1 per cent of manganese stearate and 0.1 per cent of soda as a catalyst. An oxidation product is obtained which has the following data: Acid number 80, saponification number 164.

By the oxidation of a petrolatum having been subjected to no such pretreatment or only to an oxidizing or hydrogenating treatment, after a 3 hours' oxidation under the above named conditions products were obtained having acid numbers of between 15 and 25 and saponification numbers of between 35 and 55. When continuing treatment with oxidizing gases the oxidation process may soon be completely brought to a stop, the reaction product assuming a dark color. In this case acid numbers of about 30 and saponification numbers of about 70 cannot be exceeded even when blowing with air for several days.

What we claim is:—

1. Process for the production of fatty acids from solid or liquid mixtures of hydrocarbons of the aliphatic series by treating the hydrocarbons, while in a liquid state, with anhydrous halides readily hydrolizable by water, separating the resulting polymerization products and then oxidizing the hydrocarbons with oxygen furnishing gases.

2. Process for the production of fatty acids from solid or liquid mixtures of hydrocarbons of the aliphatic series by treating the hydrocarbons, while in a liquid state with at least one anhydrous halide selected from the group consisting of boron fluoride, boron chloride, anhydrous aluminium chloride, silicon tetrachloride, titanium tetrachloride, tin tetrachloride, zinc chloride, ferric chloride, and antimony pentachloride, separating the resulting polymerization products and then oxidizing the hydrocarbons with oxygen furnishing gases.

3. Process for the production of fatty acids from solid or liquid mixtures of hydrocarbons of the aliphatic series by treating the hydrocarbons, while in a liquid state with at least one anhydrous halide selected from the group consisting of boron fluoride, boron chloride, anhydrous aluminium chloride, silicon tetrachloride, titanium tetrachloride, tin tetrachloride, zinc chloride, ferric chloride, and antimony pentachloride, in an amount of up to 3 per cent by weight of the hydrocarbons, separating the resulting polymerization products and then oxidizing the hydrocarbons with oxygen furnishing gases.

4. Process for the production of fatty acids from solid or liquid mixtures of hydrocarbons of the aliphatic series by treating the hydrocarbons, while in a liquid state with at least one anhydrous halide selected from the group consisting of boron fluoride, boron chloride, anhydrous aluminium chloride, silicon tetrachloride, titanium tetrachloride, tin tetrachloride, zinc chloride, ferric chloride, and antimony pentachloride, in an amount of up to 3 per cent by weight of the hydrocarbons at temperatures between about 50 and about 110° C., separating the resulting polymerization products and then oxidizing the hydrocarbons with oxygen furnishing gases.

5. Process for the production of fatty acids from solid or liquid mixtures of hydrocarbons of the aliphatic series by treating the hydrocarbons, while in a liquid state with at least one anhydrous halide selected from the group consisting of boron fluoride, boron chloride, anhydrous aluminium chloride, silicon tetrachloride, titanium tetrachloride, tin tetrachloride, zinc chloride, ferric chloride, and antimony pentachloride, in an amount of up to 3 per cent by weight of the hydrocarbons at temperatures between about 50 and about 110° C., separating the resulting polymerization products, finally by filtering in the presence of highly porous substances and then oxidizing the hydrocarbons with oxygen furnishing gases.

6. The process for the production of fatty acids from petrolatum resulting in the manufacture of lubricating oils, which comprises treating the petrolatum with anhydrous aluminium chloride in an amount of up to 3% by weight of the hydrocarbon at temperatures between about 50 and about 110° C., separating the resulting polymerization products, and then oxidizing the petrolatum with oxygen furnishing gases.

EMIL KEUNECKE.
ROBERT WERNER.